United States Patent [19]

Anemojanis

[11] Patent Number: 5,894,564
[45] Date of Patent: Apr. 13, 1999

[54] SYSTEM FOR IDENTIFYING MEMORY SEGMENT BOUNDED BY PREVIOUSLY ACCESSED MEMORY LOCATIONS WITHIN DATA BLOCK AND TRANSFERRING THEREOF ONLY WHEN THE SEGMENT HAS BEEN CHANGED

[75] Inventor: Eugene Anemojanis, Austin, Tex.

[73] Assignee: International Business Machines Corporation, Armonk, N.Y.

[21] Appl. No.: 08/889,630

[22] Filed: Jul. 8, 1997

Related U.S. Application Data

[63] Continuation of application No. 08/488,316, Jun. 7, 1995, abandoned.

[51] Int. Cl.$^6$ .................................................. G06F 13/00
[52] U.S. Cl. ............................ 395/853; 711/129; 711/136; 711/153; 711/117
[58] Field of Search .................. 340/172.5; 711/129, 711/153, 173; 384/900, 300, 200, 419; 395/148, 275, 425, 610, 405, 114, 457, 483, 445, 497.01, 439, 848; 371/40.4; 707/8

[56] References Cited

U.S. PATENT DOCUMENTS

| 3,241,125 | 3/1966 | Tomasulo et al. | 340/172.5 |
|---|---|---|---|
| 3,643,225 | 2/1972 | Rice et al. | 711/153 |
| 3,803,555 | 4/1974 | Mayne et al. | 395/853 |
| 3,969,722 | 7/1976 | Danco et al. | 364/188 |
| 3,969,723 | 7/1976 | Kennicott | 364/188 |
| 4,189,781 | 2/1980 | Douglas | 711/173 |
| 4,437,155 | 3/1984 | Sawyer et al. | 395/463 |
| 4,463,424 | 7/1984 | Mattson et al. | 711/136 |
| 4,464,712 | 8/1984 | Fletcher | 711/122 |
| 4,523,275 | 6/1985 | Swenson et al. | 395/182.05 |
| 4,899,275 | 2/1990 | Sachs et al. | 395/403 |
| 4,905,141 | 2/1990 | Brenza | 711/129 |
| 4,933,835 | 6/1990 | Sachs et al. | 395/450 |
| 4,977,498 | 12/1990 | Rastegar et al. | 395/455 |
| 5,091,846 | 2/1992 | Sachs et al. | 395/250 |
| 5,173,854 | 12/1992 | Kaufman et al. | 707/504 |
| 5,195,101 | 3/1993 | Guenthner et al. | 395/185.02 |
| 5,239,466 | 8/1993 | Morgan et al. | 707/512 |
| 5,251,303 | 10/1993 | Fogg, Jr. et al. | 395/844 |
| 5,255,384 | 10/1993 | Sachs et al. | 395/417 |
| 5,263,144 | 11/1993 | Zurawski et al. | 711/121 |
| 5,293,618 | 3/1994 | Tandi et al. | 213/179 |
| 5,353,430 | 10/1994 | Lautzenheiser | 395/444 |
| 5,357,623 | 10/1994 | Megory-Cohen | 711/12 |
| 5,394,531 | 2/1995 | Smith | 711/136 |
| 5,408,651 | 4/1995 | Flocken et al. | 395/182.17 |

(List continued on next page.)

FOREIGN PATENT DOCUMENTS

883000902 8/1988 European Pat. Off. .

OTHER PUBLICATIONS

E. Anemojanis; *IBM Technical Disclosure Bulletin;* "Optimized Data Transfer Function for Memory Cell Map Buffers;" IBM Corp. 1983; vol. 26, No. 2, Jul. 1983; pp. 575–576.

*Primary Examiner*—Thomas C. Lee
*Assistant Examiner*—Michael G. Smith
*Attorney, Agent, or Firm*—Anthony V. S. England

[57] ABSTRACT

An information handling system includes one or more processing units, a memory management unit, connected to the processor, and to a memory system, a cache management unit, one or more levels of cache memory associated with the one or more processors, an I/O controller connected to a bus which connects to the processing units and to the memory systems and to cache, the I/O controller controlling various input/output devices such as a keyboard, a mouse, a display device, communications adapters and the like, and a remote storage controller for controlling one or more direct access storage devices. Cache management unit further includes an optimized block transfer circuit for identifying starting and ending addresses of modified segments of data blocks and the cache unit.

9 Claims, 3 Drawing Sheets

U.S. PATENT DOCUMENTS

| | | | |
|---|---|---|---|
| 5,420,965 | 5/1995 | Barker, III | 395/114 9 |
| 5,479,635 | 12/1995 | Kametani | 711/5 |
| 5,493,668 | 2/1996 | Elko et al. | 711/130 |
| 5,537,635 | 7/1996 | Douglas | 711/129 |
| 5,544,341 | 8/1996 | Nakagawa et al. | 711/118 |
| 5,574,736 | 11/1996 | Bandy | 371/40.4 |
| 5,581,737 | 12/1996 | Dahlen et al. | 711/170 |
| 5,661,848 | 8/1997 | Bonke et al. | 711/112 |
| 5,671,405 | 9/1997 | Wu et al. | 707/7 |
| 5,678,024 | 10/1997 | Wagar et al. | 711/129 |
| 5,678,064 | 10/1997 | Kulik et al. | 395/848 |
| 5,758,339 | 5/1998 | Barton et al. | 707/8 |

| FIG. 2A | FIG. 2B |

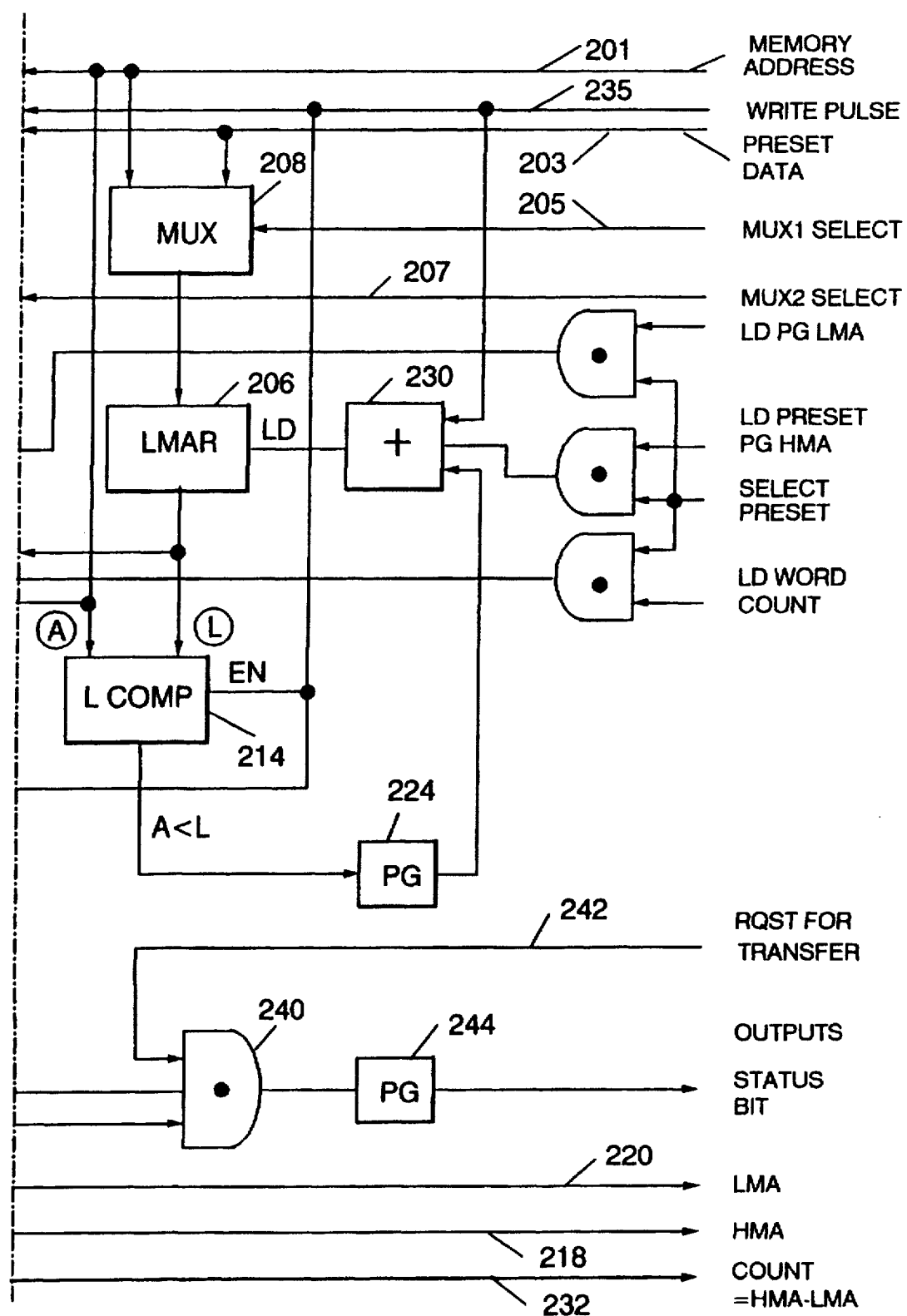

SYSTEM FOR IDENTIFYING MEMORY SEGMENT BOUNDED BY PREVIOUSLY ACCESSED MEMORY LOCATIONS WITHIN DATA BLOCK AND TRANSFERRING THEREOF ONLY WHEN THE SEGMENT HAS BEEN CHANGED

This application is a continuation of application Ser. No. 08/488,316, filed on Jun. 7, 1995, which was abandoned upon the filing hereof.

BACKGROUND OF THE INVENTION

1. Field of the Invention

The present invention relates to information handling systems, and more particularly to information handling systems requiring data block transfer such as between caches or between caches and main memory.

2. Prior Art

In the prior art there are many techniques for handling data block transfers. However, the prior art techniques all have one or more shortcomings which result in a slower block transfer than is desirable.

Examples of prior art cache memory management systems are described in U.S. Pat. No. 5,091,846 entitled "Cache Providing Caching/Non-caching write-through and Copy Back Modes for Virtual Addresses and Including Bus Snooping to Maintain Coherency" and U.S. Pat. No. 5,255,384 entitled "Memory Address Translation System Having Modifiable and Non-modifiable Translation Mechanisms." The two patents which seem to disclose different aspects of the same system, are directed to a cache and a memory address translation system.

The 846 Patent teaches a computing system, having a cache memory management system, which provides selectable access modes for addressable memory, providing cachable and non-cachable access modes, definable on a fixed page boundary basis. The various access modes can be intermixed on a page by page basis within the translation logic of the cache memory management system. The system provides high speed virtual to real address translation along with associated system tag data defining access priorities and access modes associated with each respective address translation.

The 384 patent which deals with cache memory management system features a high speed virtual to real address translation technique. Address translation logic including mutually exclusive modifiable and non-modifiable translation logic selectively provides real address output in response to the externally supplied virtual address from a processor. A cache controller selectively accesses main memory on cache memory misses to load translation information and other data from main memory to the cache memory.

Although the patents generally teach cache memory systems and address translation for use in cache memory systems, neither patent teaches the invention as taught and claimed herein.

An article published in the IBM Technical Disclosure Bulletin Volume 26, No. 2, July 1983, entitled "Optimized Data Transfer Function for Memory Cell Map Buffers" teaches a technique for optimizing data transfer using registers which store a first failing address and a last failing address and comparators for determining whether a particular address falls within the first and last address or outside of the range of the first and last address.

Although the TDB article contains some fundamental similarities to a portion of the present invention as shown and claimed herein, the TDB article does not provide a technique for transferring only a modified segment of a data block as is shown and claimed herein.

SUMMARY OF THE INVENTION

Therefore, it is an object of the present invention to improve efficiency of a data processing system by transferring only modified segments of stored data blocks to improve speed and efficiency of operation.

Accordingly, an information handling system includes one or more processing units, a memory management unit, connected to the processor, and to a memory system, a cache management unit, one or more levels of cache memory associated with the one or more processors, an I/O controller connected to a bus which connects to the processing units and to the memory systems and to cache, the I/O controller controlling various input/output devices such as a keyboard, a mouse, a display device, communications adapters and the like, and a remote storage controller for controlling one or more direct access storage devices. Cache management unit further includes an optimized block transfer circuit for identifying starting and ending addresses of modified segments of data blocks and the cache unit.

It is an advantage of the present invention that the optimized data block transfer unit enables the system to identify, in real time, a modified area between an upper and lower limit of addresses effected within an address space allowing the system to operate only on the effected segment rather than on an entire block of data.

Other features and advantages of the present invention will become apparent in the following detailed description of the preferred embodiment of the invention taken in conjunction with the accompanying drawing.

DETAILED DESCRIPTION OF A PREFERRED EMBODIMENT OF THE INVENTION

Figure 1:
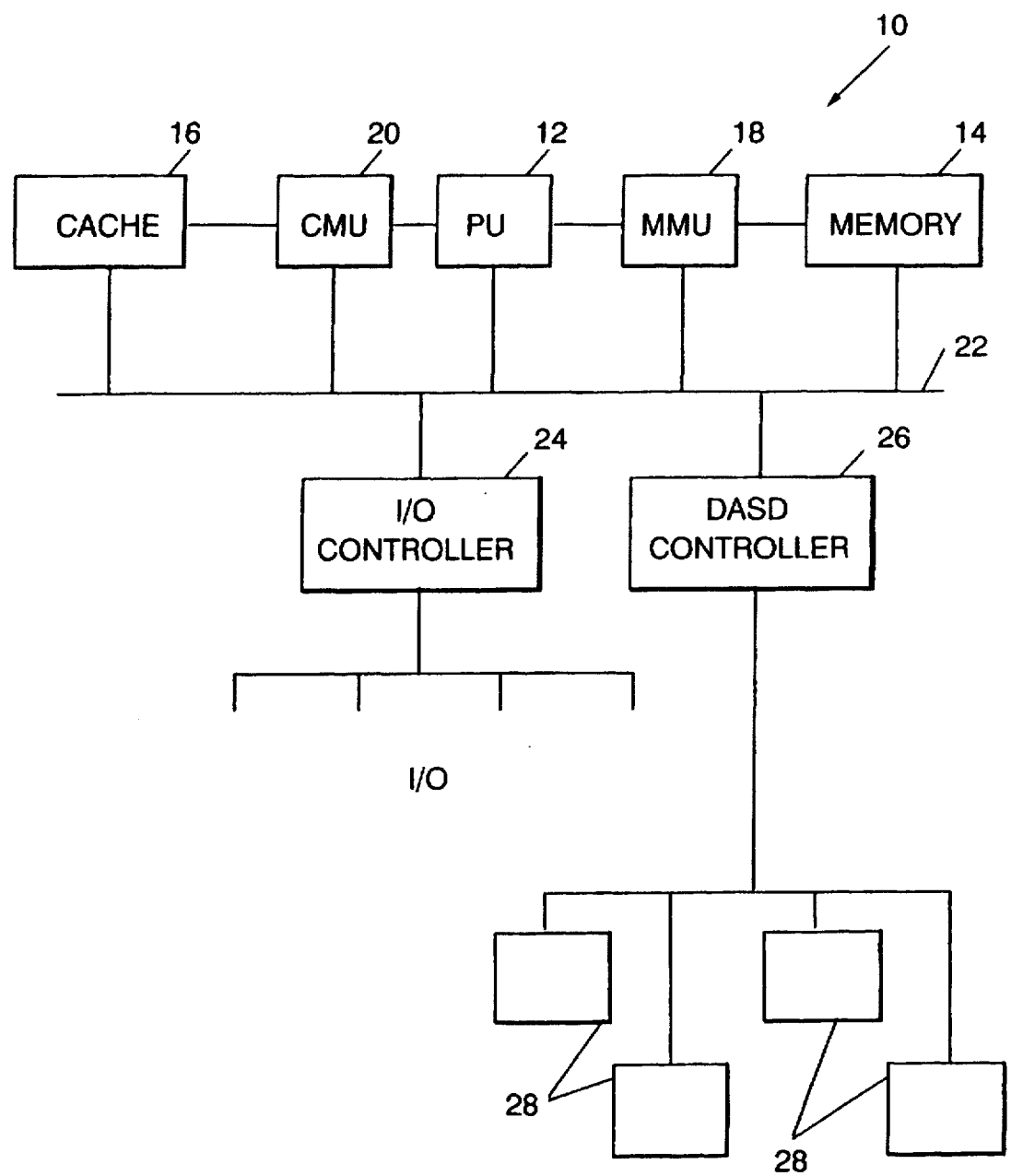
FIG. 1 is a block diagram of an information handling system implementing the present invention.

Referring now to FIG. 1, an information handling system implementing the present invention will be described.

Information handling systems can include one or more processing units 12, a memory subsystem 14 and one or more caches 16. Processing units 12 are connected to cache management Unit 20, Memory management unit 18 and bus 22. CMU 20 and MMU 18 control flow of address and data between processor units 12 and respective memory subsystem 14 or caches 16 respectively. One or more I/O controllers 24 which connect to I/O devices (not shown) and to system bus 22 and a DASD controller 26 which connect between system bus 22 and one or more direct access storage devices 28 are also included in system 10. Each of the units identified above are well known in the art and will not be described in greater detail herein except for the optimized data block transfer circuit of memory management unit 18 which will be further described with reference to FIG. 2.

Figures 2, 2A:
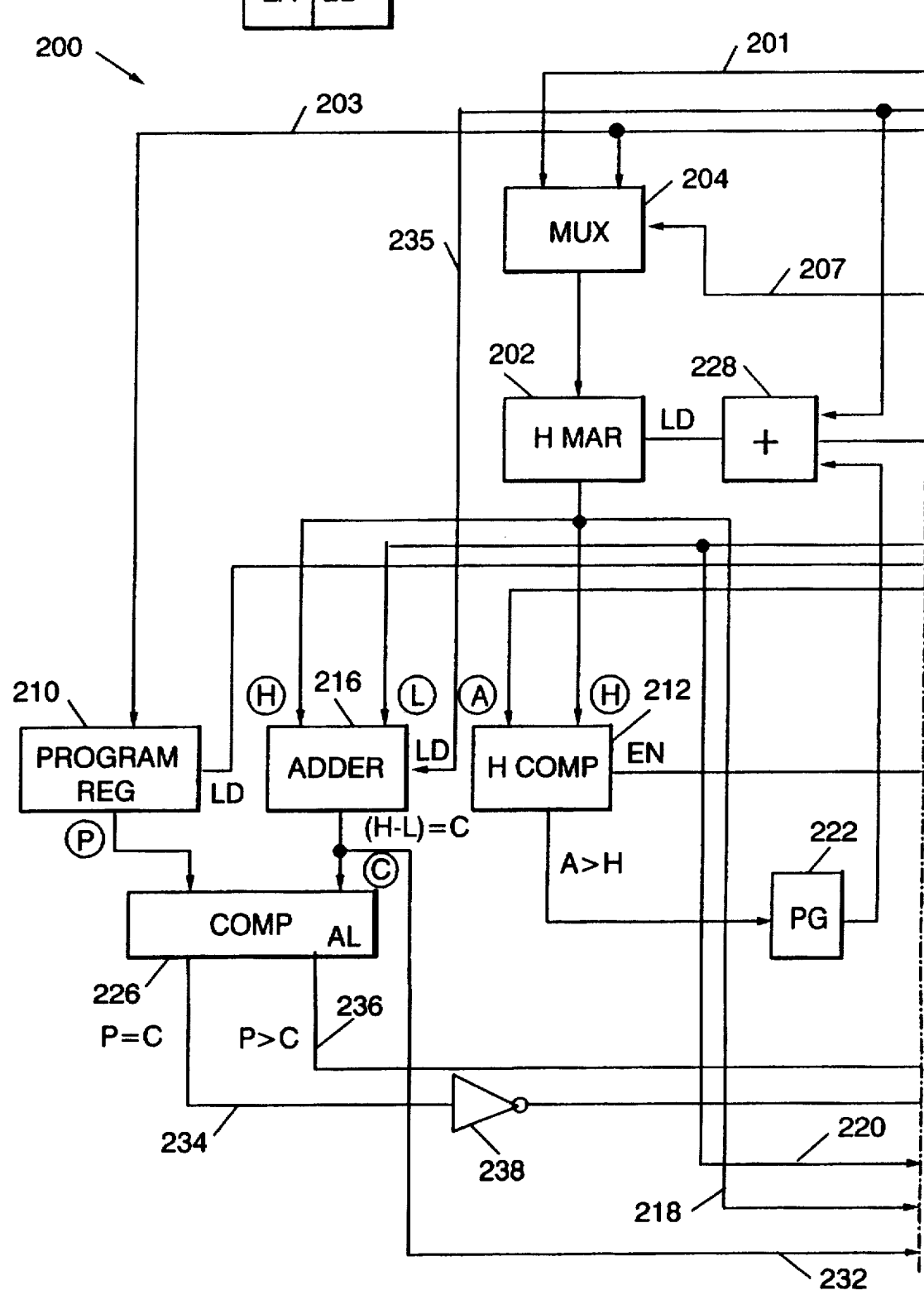
FIG. 2 (including FIGS. 2A and 2B) is a circuit diagram of an optimized block transfer circuit in accordance with the present invention.

Referring now to FIG. 2, the optimized data block transfer circuit 200 in accordance with the present invention will be further described.

A high memory address register (HMAR) 202 is preset to a page lower boundary address for (pgLMA) by data transmitted on preset data line 203 through multiplexer 204. Multiplexer 204 has two sets of inputs the first set being the preset data on line 203 and the second set being the memory address on line 201. Multiplexer 204 is controlled by MUX2 select on line 207. Similarly, a low memory address register (LMAR) 206 is preset to a page upper boundary address (pgHMA) from data present on preset data line 203 through multiplexer 208. Multiplexer 208 has a first set of inputs from preset data line 203 and a second set of inputs from memory address on line 201 selected by MUX1 select on line 205. Next, program register 210 is preset to a segment limit (pgHMA-pgLMA) such as the word count of the block size by data on preset data line 203. An output of HMAR 202 is connected to H Compare 212 and to one set of inputs to adder 216 as well as being output on line 218 identified as HMA (high memory address). A second input to H Compare 212 is a memory address on line 201. Thus, the H Compare circuit compares the contents of high memory address register 202 with the current address.

Similarly, an output of LMAR 206 is connected as one set of inputs to L Compare 214 and as a second set of inputs to adder 216 as well as being output on lines 220 as LMA (low memory address). The output of H Compare 212, enabled by write pulse on line 235, which represents a comparison of the current address with the preset high memory address, is connected to the input of pulse generator (PG) circuit 222 the output of which is connected to OR circuit 228 as one input thereof. The output of L Compare 214, enabled by write pulse on line 235, representing the comparison of the current address with the low memory preset, is connected to an input of PG circuit 224, the output of which is connected to an input of OR circuit 230. The output of adder circuit 216 represents the difference between the output of HMAR 202 and LMAR 206 or a count of H minus L. This output is provided on line 232 as a count of address difference. The H-L count is input to comparator 226 where it is compared with the output of program register 210. The output of program register 210 is a preset number which is the word count for the block size as indicated above. The word count is compared to the count from adder 216 with a first output of compare 226 on line 234 indicating P equal to C and a second output of compare 226 on line 236 indicating P greater than C. Only one of lines 234 and 236 may be active at the same time since the conditions are mutually exclusive. Line 234 is connected to inverter 238 the output of which is connected as one input to AND circuit 240. A second input of AND circuit 240 is line 236. A third input is the Request for Transfer signal on line 242. Thus, if line 236 is active and line 234 is inactive, AND circuit 240 is ready for an enable signal on line 242. Thus, if P is greater than or equal to C, an output will be generated from AND circuit 240 which will be input to PG circuit 244 which produces as an output a status bit which initiates the transfer of the low memory address, the high memory address, and the word count of the modified segment on lines 220, 218 and 232 as identified above.

It should be noted that H comparator 212 compares the actual address on lines 201 with the preset address loaded in HMAR 202. If the actual address is greater than the contents of HMAR 202, the actual address on lines 201 then loaded into HMAR 202.

Similarly, L compare 214 compares the actual address with the preset address loaded into LMAR 206. If the actual address is less than the contents of LMAR 206, the actual address is loaded in LMAR 206.

The outputs of adder 216 have the following meanings.

If HMAR minus LMAR is greater than zero, but not equal to P, the segment bounded between HMAR and LMAR was modified.

If HMAR minus LMAR is equal to P (the preset word count of block size), no memory contents were modified.

A pulse output of PG 244 indicates that C is less than P and that modification has occurred. This initiates the transfer of the addresses and the word count of the modified segment. There is no output from PG 244 if P is equal to C.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:
   one or more processing units;
   a memory subsystem;
   a memory management unit connected to said processing units and to said memory subsystem, for controlling transfer of address, data and instructions between said memory subsystem and said processor units; and
   one or more input/output controllers connected to said processor units and said memory subsystem by a bus,
   wherein said memory management unit further comprises a block data transfer unit, the block data transfer unit including logic for identifying, within a prescribed block of memory locations, a segment which bounds previously accessed memory locations within the block of memory locations, so that a subsequent transfer of information stored within the block of memory locations may be limited to only a transfer of the identified segment, and
   wherein said block data transfer unit further includes means for transferring only the identified segment to eliminate the need for transferring the entire block when only the identified segment thereof has been changed.

2. The information handling system according to claim 1, wherein said block data transfer unit further comprises:
   a first register for storing a first preset address;
   a second register for storing a second preset address;
   a first comparator for comparing a current address with said first preset address;
   a second comparator for comparing a current address with said second preset address; and
   an adder circuit for calculating a difference between outputs of said first register and said second register to obtain a count representative of an address difference between the boundaries of the identified segment in the block of memory locations.

3. The information handling system according to claim 2, wherein said block data transfer unit further comprises:
   a third register for storing a preset number which represents a segment limit, the segment limit including a word count of a block size of the block of memory locations; and
   a third compare circuit for comparing an output of said adder with an output of said third register to determine a status condition with regard to the identified segment of the block of memory locations.

4. A memory management unit, for controlling data transfer between a memory subsystem and a processor, comprising:

a block data transfer unit having logic for identifying, within a prescribed block of memory locations of the memory subsystem, a segment which bounds previously accessed memory locations within the block of memory locations, so that a subsequent transfer of information stored within the block of memory locations may be limited to only a transfer of the identified segment; and means for transferring only the identified segment to eliminate the need for transferring the entire block when only the identified segment thereof has been changed.

5. The memory management unit, for controlling data transfer between a memory subsystem and a processor, according to claim 4, further comprising:

a first register for storing a first preset address;

a second register for storing a second preset address;

a first comparator for comparing a current address with said first preset address;

a second comparator for comparing a current address with said second preset address; and an adder circuit for calculating a difference between outputs of said first register and said second register to obtain a count representative of an address difference between the boundaries of the identified segment in the block of memory locations.

6. The memory management unit, for controlling data transfer between a memory subsystem and a processor, according to claim 5, further comprising:

a third register for storing a preset number which represents a segment limit, the segment limit including a word count of a block size of the block of memory locations; and a third compare circuit for comparing an output of said adder with an output of said third register to determine a status condition with regard to the identified segment of the block of memory locations.

7. An information handling system comprising:

a processor;

a memory subsystem coupled to said processor, said memory subsystem including memory locations; and a memory management unit for controlling access by said processor to the memory locations, said memory management unit including logic for identifying, within a prescribed block of the memory locations, a segment which bounds previously accessed memory locations with the block of memory locations, so that a subsequent transfer of information stored within the block of memory locations may be limited to only a transfer of the identified segment.

8. The information handling system of claim 7, wherein the logic of said memory management unit includes:

first and second registers for pointing to accessed memory locations, said first and second registers further for being initialized, prior to an initial memory access, to point to upper and lower memory location boundaries of the block of memory locations.

9. The information handling system of claim 8, wherein the logic of said memory management unit further includes:

at least one element for setting one of the first and second registers to point to a newly accessed memory location in response to a comparison of the newly accessed memory location with a currently pointed to location, wherein in response to accesses to the block of memory locations, one of the first and second registers is set to point to an uppermost memory location which has been accessed and the other one of the registers is set to point to a lowermost memory location which has been accessed.

* * * * *